Nov. 22, 1966  S. H. J. ÅKERSTRÖM  3,287,393
METHOD OF PREPARING 2-CHLORO-6-NITRO BENZONITRILE
Filed April 22, 1963
CONDENSATION
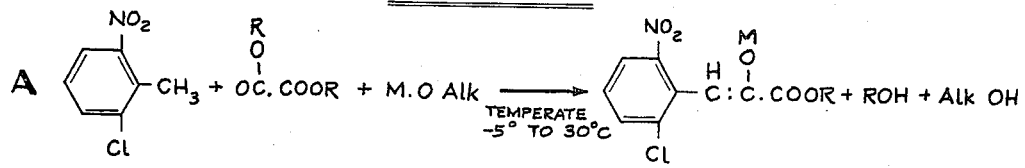
CONVERSION OF ENOLATE TO THE KETO TAUTOMER
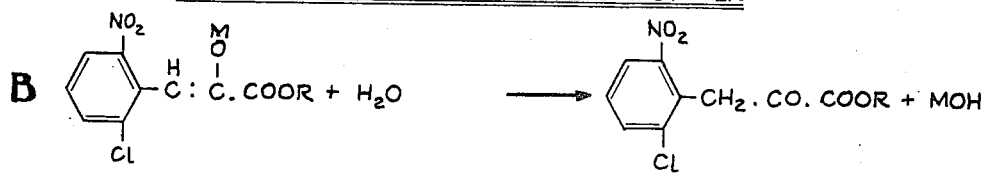
HYDROLYSIS
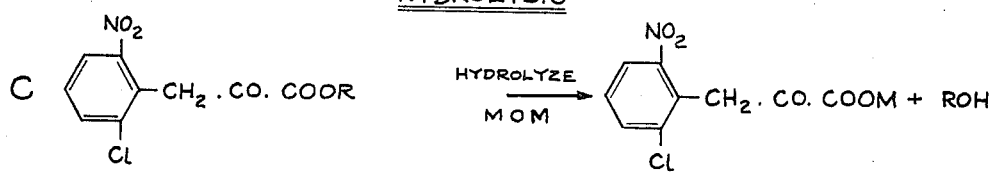
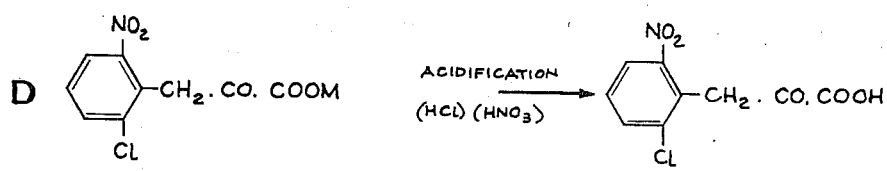
HYDROXYIMINATION
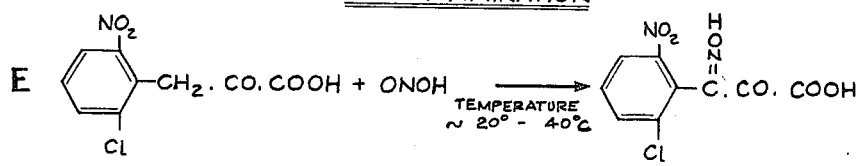
OXIDATION, DECARBOXYLATION & DEHYDRATION
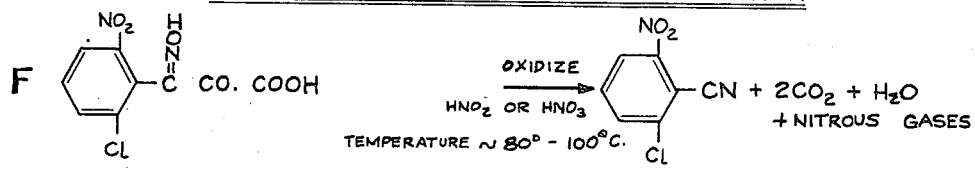
M = Alkali metal
R = Lower alkyl
Alk = Lower alkyl
INVENTOR.
STIG HJALMAR JOHANNES ÅKERSTRÖM
BY Hane + Nydick
ATTORNEYS 3,287,393
METHOD OF PREPARING 2-CHLORO-6-NITRO-BENZONITRILE
Stig Hjalmar Johannes Åkerström, Karlskoga, Sweden, assignor to Aktiebolaget Bofors, Bofors, Sweden, a corporation of Sweden
Filed Apr. 22, 1963, Ser. No. 274,631
11 Claims. (Cl. 260—465)

This invention relates to 2-chloro-6-nitro-benzonitrile. More particularly, it is directed to a novel method of producing that compound, including methods for the production of intermediates.

It has been known that 2,6-dichloro-benzonitrile can be produced from 2-chloro-6-nitro-toluene via 2-chloro-6-amino-toluene; 2,6-dichloro-toluene, 2,6-dichloro-benzalchloride; 2,6-dichloro-benzaldehyde; 2,6-dichloro-benzaldoxime; and finally, 2,6-dichloro-benzonitrile, which end product has excellent herbicidal properties.

Said known method of producing 2,6-dichloro-benzonitrile is very complicated and very expensive.

It is among the principal objects of this invention to provide a simple and inexpensive method of producing 2-chloro-6-nitro-benzonitrile which nitrile is readily convertible to 2,6-dichloro-benzonitrile; as well as to methods of producing intermediates leading to the production of said nitrile.

The objects of this invention are achieved by using 2-chloro-6-nitro-toluene as the starting material which is condensed so that a derivative of 2-chloro-6-nitrophenylpyruvic acid is formed. This derivative is hydroxyaminated, oxidized, decarboxylated, and dehydrated, there being thus produced 2-chloro-6-nitro-benzonitrile which can be easily converted into 2,6-dichloro-benzonitrile in the presence of chlorine at a temperature of approximately 200° C.

The reaction steps involved, as set forth in the accompanying flow sheet, are:

(A) Condensation of 2-chloro-6-nitro-toluene with a lower alkyl ester of oxalic acid in the presence of a condensing agent, such as an alkali metal lower alkoxide; an alkali metal amide, an alkali metal hydride and an alkali metal to form an alkali metal enolate of a lower alkyl ester of β-(2-chloro-6-nitrophenyl) pyruvic acid;
(B) Allowing the product of step (A) to rearrange into the keto tautomer;
(C) Hydrolyzing the ester produced in step (B) to form the alkali metal salt of the keto acid;
(D) Acidifying the salt formed in step (C) to produce the free keto acid;
(E) Reacting the free keto acid formed in step (D) with nitrous acid to form β-(2-chloro-6-nitro-phenyl)-β-hydroxyimino-pyruvic acid;
(F) Reacting the oxime produced in step (E) in the presence of an oxidizing agent to effect decarboxylation, oxidation and dehydration to form 2-chloro-6-nitro-benzonitrile.

Alternatively, the ester formed in step (C) may be hydroxyiminated; and thereafter hydrolyzed, followed by decarboxylation, oxidation and dehydration.

In carrying out step (A), a solvent may be used, such as an alcohol, an ether, a dialkyl carboxy amide, a dialkyl sulfoxide and pyridine or a substituted pyridine.

The following are examples in accordance with this invention:

*Example 1*

11.5 g. of sodium are dissolved in 160 ml. of absolute ethanol. Then a mixture of dimethyloxalate (60 g.) and 2-chloro-6-nitro-toluene (85.8 g.) is added thereto. The solution turns reddish brown and the reaction mixture refluxed for about one hour. Then 160 ml. of water are added thereto, and the refluxing is allowed to continue for a further two hours. The alcohol is distilled off; and approximately 100 ml. of water are added after which the reaction mixture is cooled while stirring. Any precipitate formed is filtered off; and the filtrate extracted a couple of times with diethyl ether.

The ether is removed from the filtrate by heating.

The residue acidified with hydrochloric acid (1:1). On acidification, an oil precipitates which, however, soon stiffens.

The oil or the crystalline mass is dissolved, heated to 90° C. in approx. 500 ml. of water, and 70 g. of sodium nitrile is added at the same temperature. Thereafter 100 ml. of hydrochloric acid (1:1) is dripped in at 90° C., and the product is then nitrosed, oxidized, decarboxylated and dehydrated. When the hydrochloric acid is added, the 2,6-chloronitrobenzonitrile desired is precipitated, and after cooling it is filtered off and washed with water and alcohol. The end product has a melting point of 122–123° C.

*Example 2*

100 ml. of dry diethyl ether and 20.5 g. of potassium are charged to a 800 ml. flask with a removable cover. Using a dropping funnel, 100 ml. of anhydrous ethanol are added at such a rate that slow refluxing is produced. When all of the sodium dissolves, the reaction mixture is cooled to 0° C. 109.5 g. of diethyl oxalate are added thereto, all at one time. Then, while stirring, 85.8 g. of 2-chloro-6-nitro-toluene, dissolved in 150 ml. of dry diethyl ether, are added during a period of approximately two hours. The temperature is maintained at from −5° to 0° C. The solution is then allowed to reach the ambient temperature and left overnight. A red crystalline mass separates. It is filtered and washed with dry diethyl ether and vacuum dried. The product is the potassium enolate of 2-chloro-6-nitro-phenyl-pyruvic acid ethyl ester. Its weight is 152 g. (98%).

To 89.2 g. of the last mentioned product, 150 ml. of water are added and stirred at ambient temperature for about one hour. The color of the solution changes from dark red to dark yellow. Then 70 ml. of hydrochloric acid (1:1) are added; and 2-chloro-6-nitro-phenyl-pyruvic acid is precipitated.

The precipitate is filtered off, washed with water and dried. From the filtrate, additional product is obtained by extraction with diethyl ether. The total amount of said acid produced is 66.5 g. (95%).

24.4 g. of the last-mentioned acid are suspended in 100 ml. of water; and 20 g. of sodium nitrite added thereto. The mixture is stirred for one hour at ambient temperature. Then the solution is gradually heated to 90° C., after which 90 ml. of hydrochloric acid (1:1) are dripped in during the course of one hour.

Nitrous gases are developed, and the reaction mixture is held at this temperature for a further thirty minutes; cooled while stirring and filtered; washed with water and ethanol; and dried.

The product obtained (14.0 g.), yield (77%), is 2-chloro-6-nitro-benzonitrile having a melting point of 122–123° C.

*Example 3*

175 ml. of dry diisopropyl-ether and 20.5 g. of potassium are charged to a 2-liter flask with a removable cover. 100 ml. of anhydrous ethanol are added thereto from a dropping funnel, at such a rate that slow refluxing is produced. When all of the potassium dissolves, the mixture is cooled to 0° C.; and 109.5 g. of diethyloxalate added thereto all at one time. While stirring, 85.8 g. of 2- chloro-6-nitro-toluene (dissolved in 150 ml. of diisopropyl-ether) are added through a dropping funnel during the course of about two hours. The solution is then allowed to reach ambient temperature and stand overnight.

400 ml. of toluene are added to the solution and the mixture heated to 110° C. on an oil bath, under reduced pressure, thereby distilling off approximately 400 ml. of a mixture of diisopropyl-ether, ethanol and toluene. Then 200 ml. of toluene are added to the residue and cooled to ambient temperature while stirring. The potassium enolate precipitates; is filtered or centrifuged; and dried under vacuum (weight, 145 g.), yield (94%).

60 g. of the enolate are suspended in a solution of 40 g. of sodium nitrite dissolved in 200 ml. of water; and stirred for one to two hours at ambient temperature, after which 40 ml. of hydrochloric acid (1:1) are dripped in during the course of one hour. The reaction mixture is stirred for a further thirty minutes at 20–30° C.; heated to 90° C.; and 50 ml. of hydrochloric acid (1:1) are added thereto during the course of thirty minutes.

The reaction mixture is cooled, the 2-chloro-6-nitro-benzonitrile is filtered, washed with water and ethanol and dried. Yield, 27.4 g. (77%); melting point, 122–123° C.

*Example 4*

600 ml. of dry toluene, 155 g. of an ethanol solution of potassium ethoxide (13.2% potassium) and 90 g. of diethyloxalate are charged to a 2-filter flask with a removable cover. 85.8 g. of 2-chloro-6-nitro-toluene dissolved in 200 ml. of toluene are dripped in at ambient temperature during the course of three hours. The mixture is stirred for another hour, after which, its temperature is raised to approximately 100° C. and the major portion of the ethanol and toluene distilled off under reduced pressure.

The mixture is then cooled to approximately 40° C.; 500 ml. of water added thereto; and stirred for thirty minutes, after which 18 g. of potassium hydroxide are added and the stirring continued for a further thirty minutes.

The reaction mixture is transferred to a separatory funnel; and the toluene layer containing unconverted 2-chloro-6-nitro-toluene separated.

The aqueous layer is returned to the reaction flask, and 50 g. of sodium nitrite added thereto. Then 50 ml. of 65% nitric acid are added while stirring for thirty minutes after which the reaction mixture is stirred for another hour. The temperature is raised to 95° C. and 70 ml. of 65% nitric acid added thereto at such a rate then an appropriate development of carbon dioxide takes place.

When all the nitric acid has been added, the reaction mixture is cooled to 50° C. The formed 2-chloro-6-nitro-benzonitrile is filtered, washed with caustic soda solution and alcohol and dried. The yield is 58 g. (80% based on the 2-chloro-6-nitro-toluene consumed); the melting point, 122–123° C.

The alkyl moiety of the oxalic acid ester, supra, can have a carbon content of 1 to 5 carbon atoms, preferably from 1 to 2 carbon atoms.

The alkyl moiety of the alkali metal alkoxide can have a carbon content of 1 to 5 carbon atoms, preferably from 1 to 2 carbon atoms.

The temperatures in certain of the reaction steps, where indicated in the drawing, are as follows:

In the condensation of the starting material with the oxalate, about —5 to about 30° C.;

In the hydroxyimination of the keto compound, about 20 to about 40° C.; and

In the conversion of the hydroxyimino compound to the end product, the nitrile, about 80 to about 100° C.

It will be understood that the foregoing description of the invention and the examples set forth are merely illustrative of the principles thereof. Accordingly, the appended claims are to be construed as defining the invention within the full spirit and scope thereof.

I claim:
1. Method of producing 2-chloro-6-nitro-benzonitrile which comprises the steps of:
    (A) reacting 2-chloro-6-nitro-toluene with (1) a di-lower alkyl oxalate in the presence of (2) an alkali metal lower alkoxide; and (3) a solvent which is a member of the group consisting of lower alkanols, lower alkyl ethers and hydrocarbons, thereby to form an alkali metal enolate of a lower alkyl ester of β-(2-chloro-6-nitro-phenyl)pyruvic acid;
    (B) rearranging said lower alkyl ester of β-(2-chloro-6-nitro-phenyl)pyruvic acid to the keto tautomer thereof;
    (C) hydrolyzing said keto tautomer to form an alkali metal salt thereof;
    (D) acidifying said alkali metal salt to form the free acid;
    (E) reacting said free acid with nitrous acid to form β-(2-nitro-6-chloro - phenyl)-β-hydroxyiminopyruvic acid; and
    (F) oxidizing said β-(2-nitro-6-chloro-phenyl)-β-hydroxyiminopyruvic acid in the presence of an oxidizing agent selected from the group consisting of nitrous and nitric acids to form 2-chloro-6-nitro-benzonitrile.

2. Method as defined in claim 1 wherein step A is carried out at a temperature of —5 to 30° C.; step E is carried out at a temperature of about 20–40° C.; and step F is carried out at a temperature of about 80–100° C.

3. Method in accordance with claim 2 wherein (1) is dimethyl oxalate and (2) is sodium ethoxide.

4. Method in accordance with claim 2 wherein (1) is diethyl oxalate and (2) is potassium ethoxide.

5. Method in accordance with claim 3 wherein the oxidizing agent in step F is nitrous acid.

6. Method in accordance with claim 3 wherein the oxidizing agent in step F is nitric acid.

7. Method in accordance with claim 4 wherein the oxidizing agent in step F is nitrous acid.

8. Method in accordance with claim 4 wherein the oxidizing agent in step F is nitric acid.

9. Method in accordance with claim 1 wherein step E precedes step C.

10. Method of producing 2-chloro-6-nitro-benzonitrile which comprises the process defined by step F of claim 1 at a temperature of about 80–100° C.

11. Method of producing 2-chloro-6-nitro-benzonitrile which comprises the steps of:
    (A) reacting 2-chloro-6-nitro-toluene with (1) a di-lower alkyl oxalate in the presence of (2) an alkali metal lower alkoxide and, (3) a solvent which is a member of the group consisting of lower alkanols, lower alkyl ethers and hydrocarbons at a temperature of —5 to 30° C., thereby to form an alkali metal enolate of a lower alkyl ester of β-(2-chloro-6-nitro-phenyl)-pyruvic acid;
    (B) rearranging said β-(2-chloro-6-nitro-phenyl) pyruvic acid to the keto tautomer thereof;
    (C) hydrolyzing said keto tautomer to form an alkali metal salt thereof;
    (D) acidifying said alkali metal salt to form the free acid;
    (E) reacting said free acid with nitrous acid to form β-(2-nitro-6-chloro-phenyl)-β-hydroxyimino - pyruvic acid; and
    (F) oxidizing said β-(2-nitro-6-chloro-phenyl)-β-hydroxyimino-pyruvic acid in the presence of an oxidizing agent selected from the group consisting of nitrous and nitric acids to form 2-chloro-6-nitro-benzonitrile.

(References on following page)

References Cited by the Examiner

UNITED STATES PATENTS

| | | | |
|---|---|---|---|
| 2,497,060 | 2/1950 | Buc | 260—465 |
| 2,522,393 | 9/1950 | Milone | 260—471 |
| 2,553,405 | 5/1951 | Dixon | 260—465 |
| 2,634,289 | 4/1953 | Butler | 260—471 |
| 2,873,294 | 2/1959 | Kline | 260—518 |
| 2,885,435 | 5/1959 | Pursglove | 260—518 |
| 3,104,258 | 9/1963 | Ferris | 260—518 |
| 3,209,024 | 9/1965 | McNelis et al. | 260—515 |
| 3,217,033 | 11/1965 | Kollonitsch | 260—515 |

OTHER REFERENCES

Blatt Organic Syntheses, 1955, collective vol. II, pp. 287–288.

Groggins Unit Processes in Organic Syntheses, 1958, pp. 497–501.

Horning: Organic Syntheses, 1955, collective vol. III, pp. 510–512.

CHARLES B. PARKER, *Primary Examiner.*

JOSEPH P. BRUST, *Examiner.*

DALE R. MANAHAND, *Assistant Examiner.*